Dec. 12, 1967     F. A. MAHER     3,357,484

TUBE SEPARATOR ASSEMBLY FOR ANNULAR FLUIDTUBE COILS

Filed Nov. 15, 1966

INVENTOR
FRANK A. MAHER
BY

ATTORNEY

United States Patent Office 3,357,484
Patented Dec. 12, 1967

3,357,484
TUBE SEPARATOR ASSEMBLY FOR ANNULAR FLUIDTUBE COILS
Frank A. Maher, Mount Prospect, Ill., assignor to Vapor Corporation, Chicago, Ill., a corporation of Delaware
Filed Nov. 15, 1966, Ser. No. 594,578
7 Claims. (Cl. 165—76)

ABSTRACT OF THE DISCLOSURE

An annularly shaped bank of fluidtube coils for a fluid heating apparatus including a plurality of tubes arranged in radial rows and concentric layers with the tubes in each layer being aligned and in each row being staggered, and separator means including sinuous spacer portions between each layer and block spacer portions secured to the sinuous spacer portions and extending between adjacent tubes in a row.

---

This invention relates in general to a separator assembly for a bank of fluidtube coils for use in a fluid heating apparatus such as a steam generator or the like, and more particularly to a separator assembly that enables faster manufacture of fluidtube coils while maintaining the functioning of spacing between rows of tubes and layers of tubes and further provides a bank of coils having a minimum amount of stress or strain and tube weakening.

The separator assembly of the invention serves to space apart layers of tubes where the layers are substantially concentrically arranged, and also to space apart tubes in a layer where the tubes are arranged in rows with adjacent tubes staggered. The separator means includes an elongated sinuously-shaped portion that is adapted to be arranged between adjacent layers, and a plurality of block spacer portions attached to the sinuously spaced portion. The block spacer portions are arranged intermediate the adjacent tubes in each row. Thus, spacing between layers of tubes and tubes in each row is accomplished by a single separator assembly. During the winding of the coil, the separator assemblies are arranged in position and merely tack welded to the tubes.

Heretofore, in the manufacture of similar fluidtube coils, it was necessary to weld individual block spacers between tubes in a row, and thereafter weld in position sinuous spacers between adjacent layers. Such resulted in the necessity of a large plurality of welds and the time for making such welds resulted in relatively slow manufacture of coils. It is well known that welding of the block spacers set up induced thermal stresses in the tubes that increased the possibility of early coil failure. Further, there is always a possibility of greatly weakening a tube through a weld by decreasing the thickness of the tube thereby increasing the chance of early coil failure.

It is therefore an object of the present invention to provide a new and improved bank of fluidtube coils that obviates the above named difficulties.

Another object of the present invention is in the provision of a separator assembly for the manufacture of banks of fluidtube coils that increases production while reducing stress or strains and the possibility of tube weakening.

A further object of the present invention is to provide a separator assembly for the construction of fluidtube coils, wherein the assembly includes an elongated, sinuously-shaped spacer portion having a plurality of block spacer portions secured thereto and extending therefrom, which spacer assembly serves to space adjacent layers of tubes apart and adjacent tubes in each row apart.

Other objects, features, and advantages of the invention will be apparent from the following detailed disclosure, taken in conjunction with the accompanying sheet of drawing, wherein like reference numerals refer to like parts, in which.

Figure 1:
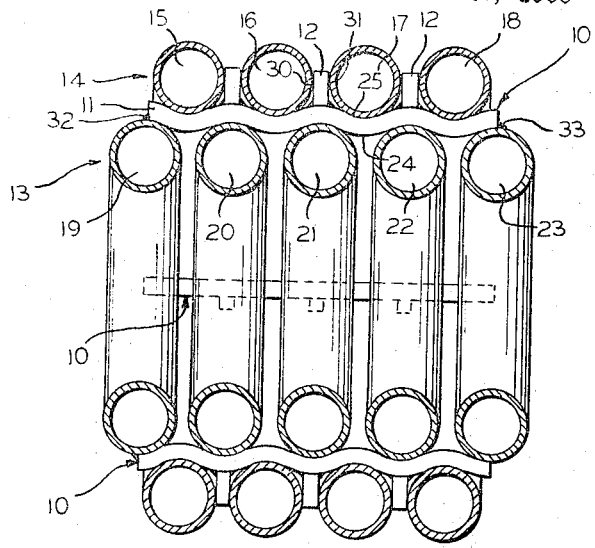
FIG. 1 is a transverse sectional view of a bank of watertube coils taken substantially along a longitudinal plane extending through the bank, and illustrating the manner in which the separator assemblies of the present invention are arranged in a bank of fluidtube coils.
Figures 3, 4:
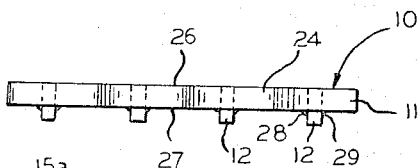
FIG. 3 is a plan view of a separator assembly according to the present invention where the block spacer portions are on the underside of the sinuously-shaped spacer portion.
FIG. 4 is an end view of the separator assembly of FIG. 3.

Referring now to the drawings, and particularly to FIGS. 3 and 4, the separator assembly according to the present invention is generally designated by the numeral 10 and includes a sinuously-shaped spacer portion 11 and a plurality of block spacer portions 12 extending therefrom. The sinuously-shaped portion 11, as seen in FIG. 1, is substantially like the sinuously-shaped spacers heretofore used, and likewise the block spacer portions are substantially like those heretofore used as block spacers, but the assembly where the block spacer portions are attached to the sinuously-shaped portion has not been heretofore known. The sinuously-shaped portion 11 of the separator assembly is adapted to space adjacent concentric layers of tubes 13 and 14 apart, while the block spacer portion 12 of the separator assembly is adapted to space tubes 15, 16, 17 and 18 apart as they are arranged in layer 14. The tubes 15 to 18 of layer 14 are in substantially radially extending rows with tubes 19, 20, 21 and 22 of layer 13 although tubes in adjacent rows are staggered. As is well known, a single continuous tube is wound in layers and rows to form a plurality of tubes in substantially radially extending rows and concentrically aranged layers to define a bank of fluidtube coils, generally designated by the letter B as shown in FIG. 1. In this arrangement, the tube 23 in layer 13 is not aligned with any tube in layer 14 although it should be appreciated that a like number of tubes may be provided in layer 14 as are provided in layer 13 if so desired.

The separator assemblies 10 include opposed sinuously-shaped surfaces 24 and 25, and opposed straight surfaces 26 and 27. The block spacers 12 are secured to the sinuous face 24 by welding, and preferably each block spacer 12 includes welds 28 and 29 on opposite sides of the block spacer portions thereby effectively making the block spacer portions 12 integral with the sinuously-shaped portion 11. Prior to the winding and formation of the bank of coils B, the separator assemblies are suitably fabricated. Each block spacer portion 12 includes opposed substantially parallel faces 30 and 31 which are arranged between adjacent tubes and in engagement therewith. It is not necessary to in any way weld each block spacer portion to a tube, although heretofore it has been the practice to weld each individual block spacer to adjacent tubes. As seen in FIG. 1, a block spacer portion 12 is welded to each convex part of the sinuous face 25, although it may be possible to further secure block spacers to each convex part of sinuous surface 24 to space apart the tubes in layer 13. In order that each block spacer portion 12 functions to space apart adjacent tubes, it must extend between adjacent tubes a distance where it may terminate slightly beyond a line extending between centers of the adjacent tubes.

During the making of a bank of fluidtube coils, the inner layer is always first wound, and thereafter the separator assemblies are secured in place to tubes of the inner layer before winding of the second layer. In the embodiment of FIG. 1, the separator assembly 10 is shown tack welded at 32 and 33 between the sinuously-shaped spacer portion 11 and tubes 19 and 23. The block spacer portions 12 extend radially outwardly from the sinuously-shaped spacer portion. Any number of separator assemblies may be employed in order to give the proper spacing between layers and tubes.

Figure 2:
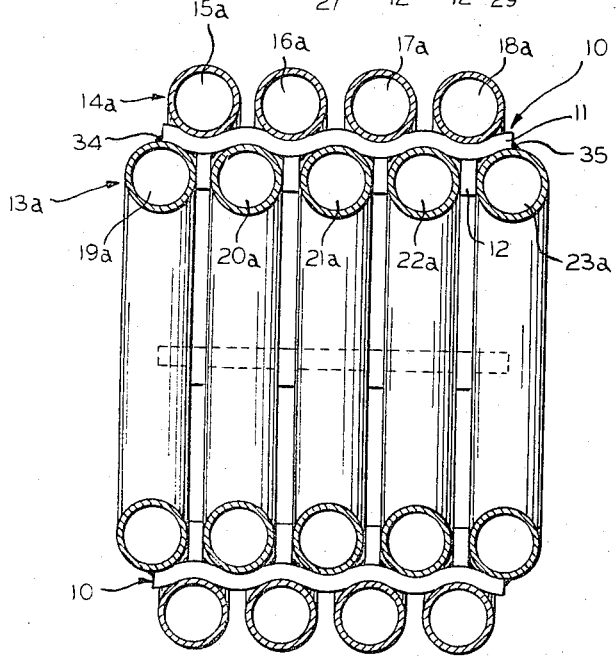
FIG. 2 is a view similar to FIG. 1, and illustrating the separator assemblies of the present invention used in another fashion.

The spacer block portions 12 in the embodiment of FIG. 2 extend radially inwardly from the sinuously-shaped spacer portion 11 in order to space the tubes apart in layer 13a. When winding the coil of this embodiment, the inner layer 13a is first formed, and thereafter the separator assemblies 10 are positioned on the inner layer and secured thereto. It is necessary to urge the block spacer portions 12 between adjacent tubes in the layer 13a, and thereafter to tack weld the separator assembly to the layer 13a such as by using welds 34 and 35 between the sinuous spacer portion 11 and the tubes 19a and 23a. While the separator assembly 10 is only shown as being tack welded to the inner layer at two points, it can be appreciated that it may be welded at several points such as at each of the tubes in the layer, but in any event welding of the sinuous spacer portion 11 to the layer 13a properly secures in position the block spacer portions 12 between adjacent tubes in the layer without having to resort to welding of the block spacer portions to the tubes. Such greatly reduces the number of welds necessary in the construction of a bank of fluidtube coils thereby reducing the amount of induced thermal stresses caused by welding. Quite obviously, faster production is achieved with a lesser amount of welding. Reduction in the number of welds performed likewise reduces the possibility of tube weakening that may be caused by a particular weld. Tube weakening is caused by a weld that decreases the thickness of the tube at a particular point and thereby subjects the tube to a greater possibility of early failure. While the separator assemblies 10 are shown in the drawings as being connected to the tubes by welding of the sinuously-shaped spacer to the tubes, it should be appreciated that welding of a block spacer portion to the tube may also be accomplished and may even be substituted for welding of the sinuous spacer portion to the tubes.

Should it be desired to provide a bank of watertube coils having more than two layers of coils, it can be appreciated that additional separator assemblies may be mounted on and secured to the outermost layer of tubes to thereafter allow further winding of the continuous tube through another layer.

It will be understood that modifications and variations may be effected without departing from the scope of the novel concepts of the present invention, but it is understood that this application is to be limited only by the scope of the appended claims.

The invention is hereby claimed as follows:

1. An annularly shaped bank of fluidtube coils for a fluid heating apparatus comprising, a tube of uniform cross-section throughout wound to form a plurality of tubes in substantially radially extending rows and concentrically arranged layers, the tubes in each layer being aligned and in each row being staggered, a plurality of separator means for spacing tubes from each other in each row and layers from each other, each of said separator means including a sinuous spacer portion arranged between each layer and block spacer portions secured to and extending from said sinuous spacer portion and arranged between adjacent tubes in a row.

2. An annularly shaped bank of fluidtube coils as defined in claim 1, wherein said block spacer portions extend from the same side of the sinuous spacer portion between adjacent tubes in the same row.

3. An annularly shaped bank of fluidtube coils as defined in claim 2, wherein said block spacer portions extend radially inwardly.

4. An annularly shaped bank of fluidtube coils as defined in claim 2, wherein said block spacer portions extend radially outwardly.

5. An annularly shaped bank of fluidtube coils as defined in claim 1, wherein said block spacer portions are substantially identical and therefore substantially equally space apart the tubes in each row.

6. A separator assembly for a bank of fluidtube coils comprising, an elongated sinuous spacer portion, and a plurality of block spacer portions extending from and secured to said sinuous spacer portion.

7. An annularly shaped bank of fluidtube coils as defined in claim 1, and tack welding between said sinuous spacer portion and a plurality of tubes for securing said separator means in position.

References Cited

UNITED STATES PATENTS

| | | | |
|---|---|---|---|
| 2,160,644 | 5/1939 | Clarkson | 122—510 X |
| 2,663,548 | 12/1953 | Boling | 165—76 |
| 2,980,404 | 4/1961 | Andersen et al. | 165—162 |
| 3,282,257 | 11/1966 | McInerney et al. | 165—163 X |

FOREIGN PATENTS

| | | |
|---|---|---|
| 499,085 | 11/1919 | France. |
| 1,046,570 | 10/1966 | Great Britain. |

ROBERT A. O'LEARY, *Primary Examiner.*

A. W. DAVIS, *Assistant Examiner.*